(12) United States Patent
Yadav et al.

(10) Patent No.: US 11,909,622 B1
(45) Date of Patent: Feb. 20, 2024

(54) EXTENDED PROTECTION IN SEGMENT ROUTING FLEXIBLE ALGORITHM

(71) Applicant: Ciena Corporation, Hanover, MD (US)

(72) Inventors: Bhupendra Yadav, Ottawa (CA); Prabhu Vaithilingam Vaithilingam, Kanata (CA); Gerald Smallegange, Stittsville (CA); Alwyn Joy George, Harinagar (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/342,238

(22) Filed: Jun. 27, 2023

(30) Foreign Application Priority Data

May 15, 2023 (IN) .............................. 202311033950

(51) Int. Cl.
*H04L 45/02* (2022.01)
*H04L 45/28* (2022.01)
*H04L 45/00* (2022.01)

(52) U.S. Cl.
CPC ............. *H04L 45/02* (2013.01); *H04L 45/22* (2013.01); *H04L 45/28* (2013.01)

(58) Field of Classification Search
CPC .......... H04L 45/02; H04L 45/22; H04L 45/28
USPC ......................................................... 709/238
See application file for complete search history.

(56) References Cited

U.S. PATENT DOCUMENTS

| | | | |
|---|---|---|---|
| 7,609,620 B2 | 10/2009 | Raj et al. | |
| 7,969,898 B1 | 6/2011 | Raj et al. | |
| 8,576,708 B2 | 6/2013 | Gandhi et al. | |
| 8,504,727 B2 | 8/2013 | Mohan et al. | |
| 9,049,142 B1 | 6/2015 | Osborne et al. | |
| 9,197,493 B2 | 11/2015 | Holness et al. | |
| 10,158,448 B2 | 12/2018 | Prakash et al. | |
| 10,637,768 B1* | 4/2020 | Joseph | H04L 45/02 |
| 2008/0273472 A1 | 11/2008 | Bashford et al. | |
| 2008/0275972 A1 | 11/2008 | Ellis et al. | |
| 2015/0365294 A1 | 12/2015 | Khan et al. | |
| 2019/0104058 A1* | 4/2019 | Filsfils | H04L 45/20 |
| 2020/0076727 A1 | 3/2020 | Filsfils et al. | |
| 2020/0344151 A1* | 10/2020 | Joseph | H04L 45/507 |
| 2021/0377155 A1* | 12/2021 | Chen | H04L 45/02 |

(Continued)

FOREIGN PATENT DOCUMENTS

| | | |
|---|---|---|
| CA | 2651861 A1 | 11/2007 |
| EP | 3869747 A1 | 8/2021 |

OTHER PUBLICATIONS

P. Pesenak, Ed. et al., RFC 9350 "IGP Flexible Algorithm", IETF, Feb. 2023, pp. 1-35 (Year: 2023).*

*Primary Examiner* — Anthony Mejia
(74) *Attorney, Agent, or Firm* — Baratta Law PLLC; Lawrence A. Baratta, Jr.

(57) ABSTRACT

Systems and methods for extended protection in a Segment Routing network that utilizes Flexible Algorithm include defining a first Flexible Algorithm that segregates the Segment Routing network into a first subset network that excludes any of links and nodes from the Segment Routing network; defining a second Flexible Algorithm that segregates the Segment Routing network into a second subset network, different from the first subset network; and defining extended protection for the first Flexible Algorithm with the second Flexible Algorithm whereby the second Flexible Algorithm is usable for path to protect the first Flexible Algorithm.

20 Claims, 8 Drawing Sheets

(56) References Cited

U.S. PATENT DOCUMENTS

| | | | |
|---|---|---|---|
| 2022/0141095 A1* | 5/2022 | Beeram | H04L 41/0895 370/254 |
| 2023/0092549 A1* | 3/2023 | Chen | H04L 45/50 370/392 |
| 2023/0155937 A1* | 5/2023 | Hu | H04L 45/02 370/254 |

* cited by examiner

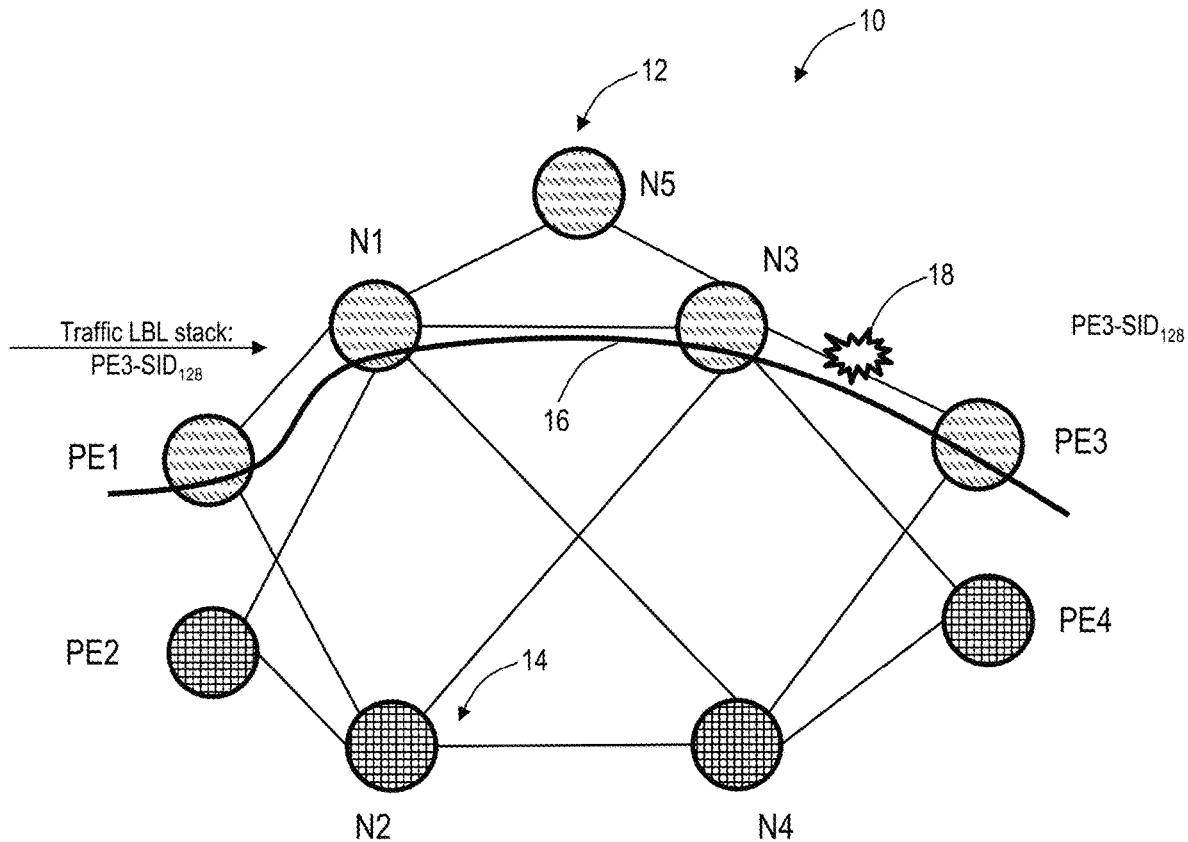
1. First Plane: All nodes all links legacy SR Nodal SID assigned to all nodes
 2. Second Plane: Only specific nodes assigned Algo 128 SIDs
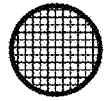 3. Third Plane: Only specific nodes assigned Algo 129 SIDs
*FIG. 1*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|Flex-Algorithm |  Metric-Type  |   Calc-Type   |    Priority   |
+-+-+-+-+-+-+-+-+-+-+-+-+-+-+-+-+-+-+-+-+-+-+-+-+-+-+-+-+-+-+-+-+
|                            Sub-TLVs                           |
+                                                               +
|                              ...                              |
|                                                               |
+-+-+-+-+-+-+-+-+-+-+-+-+-+-+-+-+-+-+-+-+-+-+-+-+-+-+-+-+-+-+-+-+
```

FIG. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |     Length    |Flex-Algorithm |  Metric-Type  |
+-+-+-+-+-+-+-+-+-+-+-+-+-+-+-+-+-+-+-+-+-+-+-+-+-+-+-+-+-+-+-+-+
|   Calc-Type   |    Priority   |
+-+-+-+-+-+-+-+-+-+-+-+-+-+-+-+-+-+-+-+-+-+-+-+-+-+-+-+-+-+-+-+-+
|                            Sub-TLVs                           |
+                                                               +
|                              ...                              |
|                                                               |
+-+-+-+-+-+-+-+-+-+-+-+-+-+-+-+-+-+-+-+-+-+-+-+-+-+-+-+-+-+-+-+-+
```

FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|     Type      |    Length     |
+-+-+-+-+-+-+-+-+-+-+-+-+-+-+-+-+-+-+-+-+-+-+-+-+-+-+-+-+-+-+-+-+
|  Preference   |   Flex Algo   |      ...
+-                                                             -+
| ...
|
+-+-+-+-+-+-+-+-+-+-+-+-+-+-+-+-+-+-+-+-+-+-+-+-+-+-+-+-+-+-+-+-+
```

FIG. 4

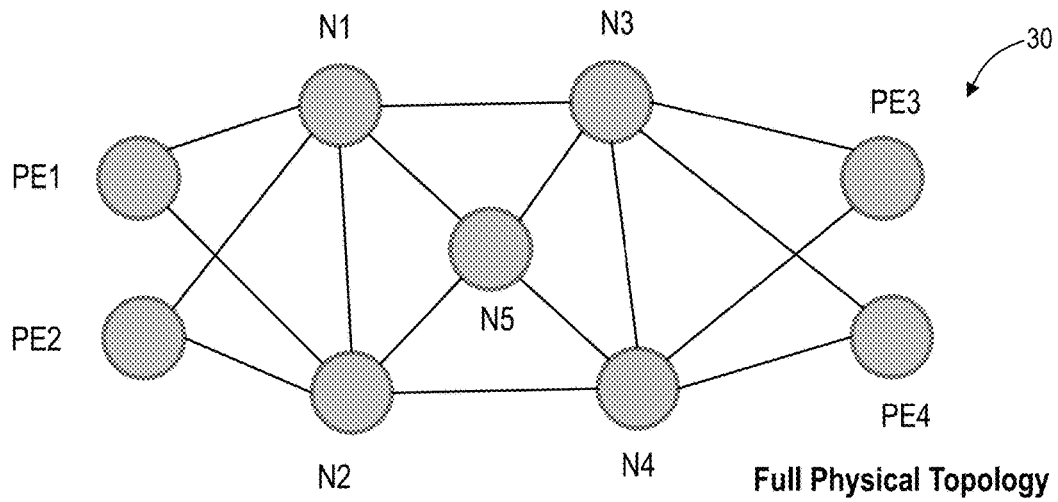
FIG. 6  Full Physical Topology
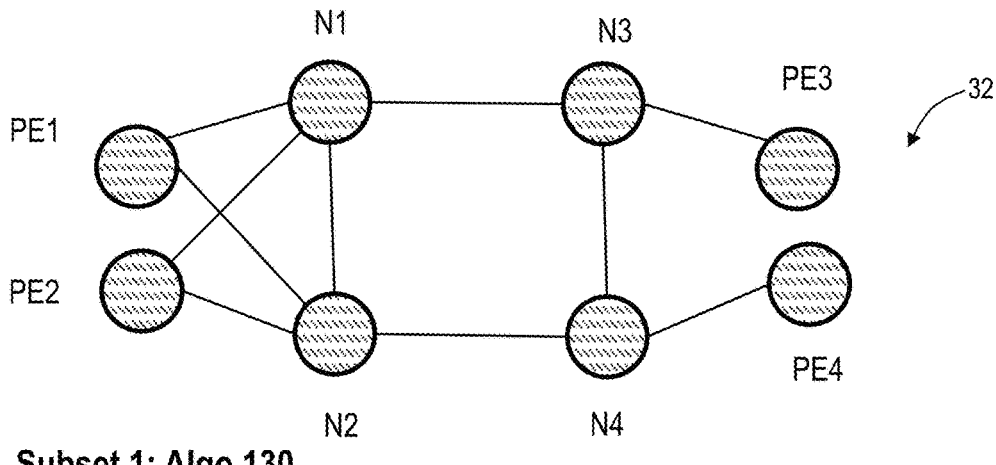
FIG. 7  Subset 1: Algo 130
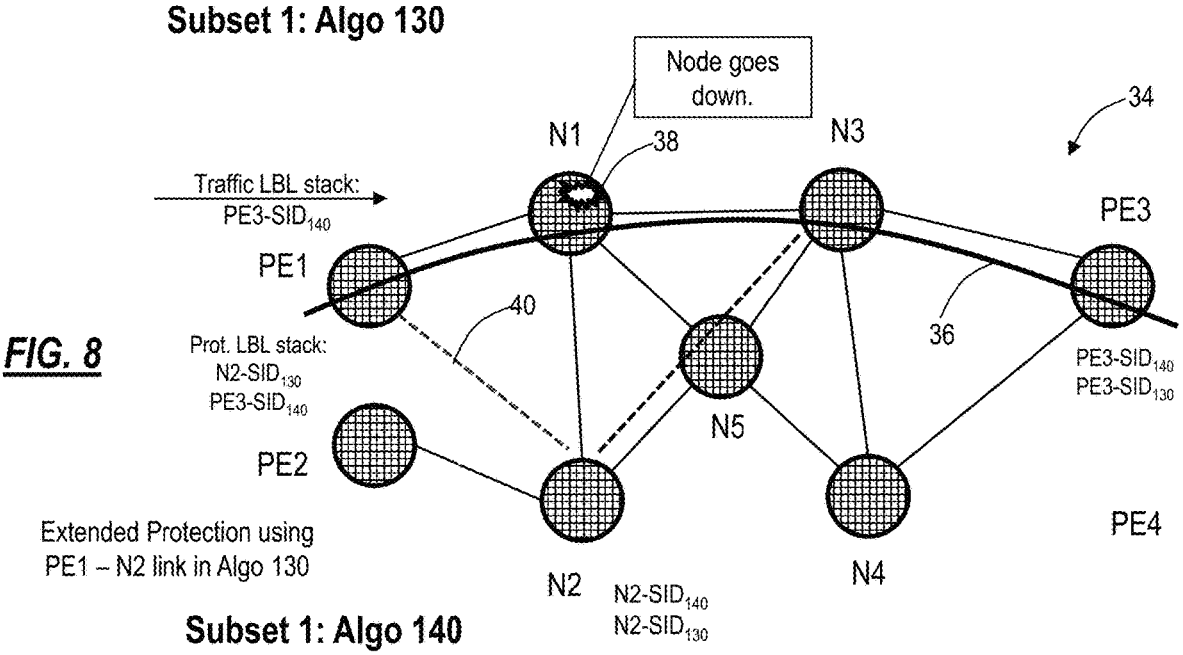
FIG. 8  Extended Protection using PE1 – N2 link in Algo 130
Subset 1: Algo 140

EXTENDED PROTECTION IN SEGMENT ROUTING FLEXIBLE ALGORITHM

FIELD OF THE DISCLOSURE

The present disclosure relates generally to networking and computing. More particularly, the present disclosure relates to systems and methods for extended protection in Segment Routing Flexible Algorithm.

BACKGROUND OF THE DISCLOSURE

Segment Routing (SR) is a technology that implements a source routing paradigm. A packet header includes a stack of function identifiers, known as segments, which define an ordered list of functions to be applied to the packet. A segment can represent any instruction, topological, or service-based, and each Segment is represented by a Segment Identifier (SID). A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. Segment Routing is described, e.g., in Fiflsfils et al., RFC 8402, "Segment Routing Architecture," Internet Engineering Task Force (IETF), July 2018, the contents of which are incorporated herein by reference. In Segment Routing, a path includes segments which are instructions a node executes on an incoming packet.

SR Flexible Algorithm (also referred to as Flex Algorithm and Flex Algo, each of these terms is equivalent) is described in RFC 9350, "IGP Flexible Algorithm," February 2023, and RFC 9351, "Border Gateway Protocol—Link State (BGP-LS) Extensions for Flexible Algorithm Advertisement," February 2023, the contents of each are incorporated by reference in their entirety. The objective of Flex Algo is to create a new plane in the network. Flex Algo is called so because it allows a user the flexibility to define:

(1) the type of calculation to be used (e.g., shortest path),
(2) the metric type to be used (e.g., Interior Gateway Protocol (IGP) metric, Traffic Engineering (TE) metric, delay, etc.), and/or
(3) the set of constraints to be used (e.g., inclusion or exclusion of certain links using affinities).

BRIEF SUMMARY OF THE DISCLOSURE

The present disclosure relates to systems and methods for extended protection in Segment Routing Flexible Algorithm. Segment Routing Flex Algo adds additional segments having different properties than IGP prefix segments, hence enriching SR Traffic Engineering (TE) with additional flexibility and user defined segments. There are many practical use cases of Flex Algo to optimally route traffic in network. These include, e.g., Plane Enforcement—Segregating network into different planes.

Network subsets—Creating several subsets of network with selected nodes and links in each subset.

Enforce topology adhering to traffic types—create subset of network adhering to low latency or having high bandwidth.

As Flex Algo segregates entire physical network into small, segregated networks, it is likely that fault tolerance for these sub networks decreases due to non-availability of protection path or sub optimal protection path for one or more hops. This can be because Topology Independent Loop-Free Alternate (TI-LFA) protection runs per Flex Algo sub network domain.

As such, the present disclosure includes a new Flexible Algorithm Definition (FAD) for extended protection information. For example, a given Flex Algo may be protected by another Flex Algo. This information can be shared using a new sub-Type, Length, Value (TLV). In operation, the extended protection can be used to switch or route traffic when there are faults and when there are no available paths on the given Flex Algo, then the extended protection can use the extended Flex Algo segments to determine the alternate. When the fault recovers on the given flex algo segment, the traffic will be recovered to the given Flex Algo domain.

In various embodiments, the present disclosure can include a method associated with a Segment Routing network that utilizes Flexible Algorithm where the method includes steps, an apparatus associated with the Segment Routing network with the apparatus configured to implement the steps, and a non-transitory computer-readable medium with instructions that, when executed, cause one or more processors to implement the steps. The steps include defining a first Flexible Algorithm that segregates the Segment Routing network into a first subset network that excludes any of links and nodes from the Segment Routing network; defining a second Flexible Algorithm that segregates the Segment Routing network into a second subset network, different from the first subset network; and defining extended protection for the first Flexible Algorithm with the second Flexible Algorithm whereby the second Flexible Algorithm is usable is usable to protect one or more of a path, a node, and a link available in the first Flexible Algorithm.

The extended protection for the first Flexible Algorithm can be advertised as a sub-Type, Length, Value (TLV) in an advertisement of the first Flexible Algorithm. The steps can include defining one or more additional Flexible Algorithms that segregate the Segment Routing network into one or more additional subset networks, respectively; and defining the extended protection for the first Flexible Algorithm with the one or more additional subset networks, wherein the extended protection with the second Flexible Algorithm and the extended protection with the one or more additional subset networks each have a unique preference value used to determine which is used first.

In an embodiment, one or more of the first Flexible Algorithm and the second Flexible Algorithm can segregate the Segment Routing network to include different planes, each having at least one different node. In another embodiment, one or more of the first Flexible Algorithm and the second Flexible Algorithm can segregate the Segment Routing network to include different topologies, each having any of different nodes and links. In a further embodiment, one or more of the first Flexible Algorithm and the second Flexible Algorithm can segregate the Segment Routing network to include different traffic types, each having different links assigned to the different traffic types. The steps can include configuring one or more nodes with the first Flexible Algorithm, the second Flexible Algorithm, and the extended protection. The configuring can include installing the associated Flexible Algorithm definition and the extended protection, installing corresponding Segment Identifiers (SIDs), and configuring advertisements thereof.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of a Segment Routing network with two Flex Algos defined therein, for illustrating Flex Algo operation and potential fault tolerance issues.

FIG. 2 is a diagram of a standard FAD TLV for OSPF, with type 16, from RFC 9350, Section 5.2.

FIG. 3 is a diagram of a standard FAD TLV for ISIS, with type 26, from RFC 9350, Section 5.1.

FIG. 4 is a diagram of an example sub-TLV definition for ISIS and OSPF.

FIG. 6 is a network diagram of a Segment Routing network showing a full physical topology.

FIG. 7 is a network diagram of a Flex Algo subset network in the network of FIG. 6.

FIG. 8 is a network diagram of another Flex Algo subset network in the network of FIG. 6.

DETAILED DESCRIPTION OF THE DISCLOSURE

Figure 5:
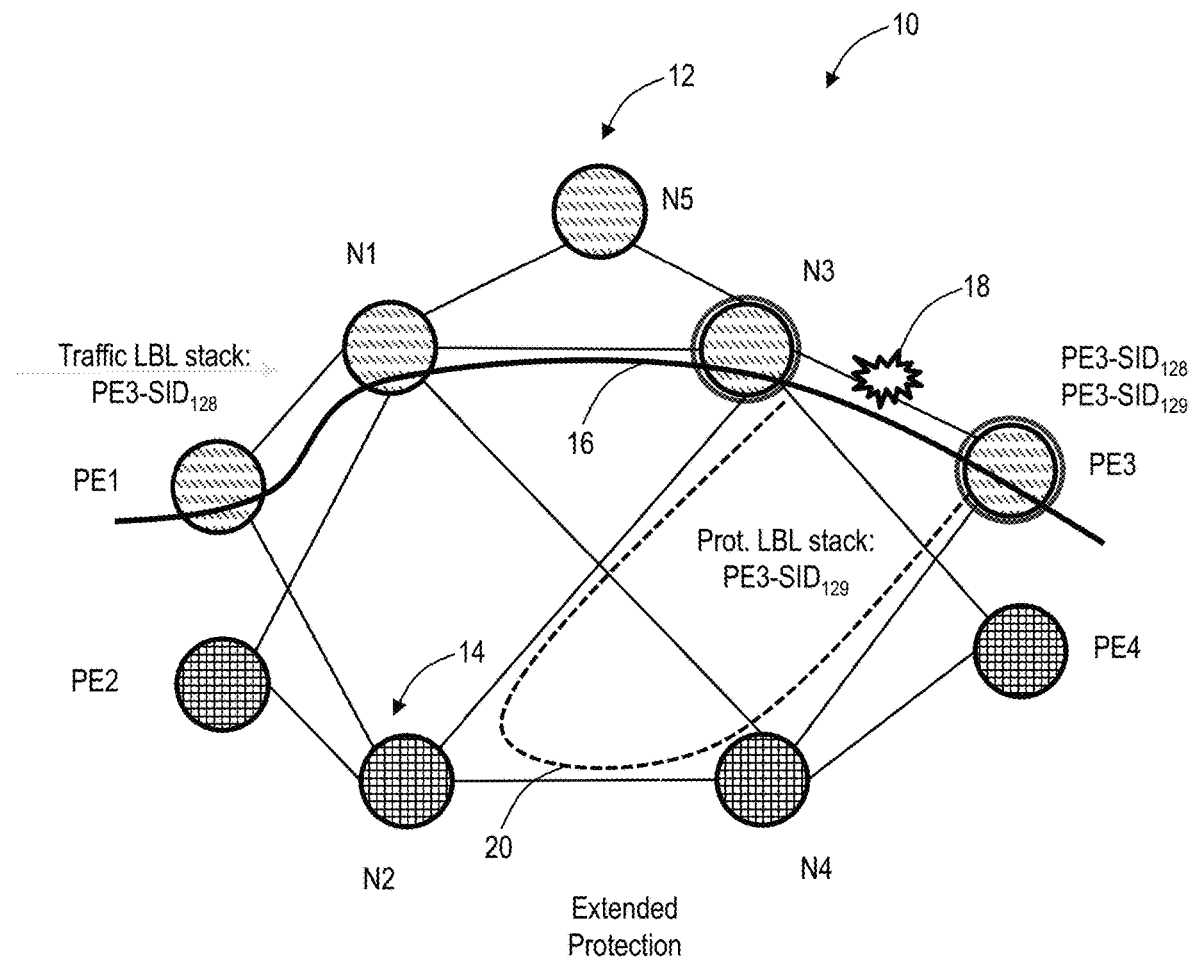
FIG. 5 is a network diagram of the Segment Routing network with two Flex Algos defined therein, for illustrating Flex Algo operation with extended protection.

Again, the present disclosure relates to systems and methods for extended protection in Segment Routing Flexible Algorithm.

Segment Routing Overview

A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published in July 2015 as draft-previdi-6man-segment-routing-header (available online at tools.ietf.org/html/draft-previdi-6man-segment-routing-header-08) and RFC 8754, "IPv6 Segment Routing Header (SRH)," March 2020, the contents of both are incorporated by reference. A segment is encoded as an IPv6 address. An ordered list of segments is encoded as an ordered list of IPv6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path or is provided a path by a Software Defined Networking (SDN) controller or Path Computation Element (PCE), and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each Segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by Open Shortest Path First (OSPF) or Intermediate System-Intermediate System (ISIS). The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a PCE (e.g., when paths span across multiple IGP areas/levels).

Flex-Algo Definition

Flex Algo is defined based on advertisements from routers using IGP (RFC 9350) and/or BGP (RFC 9351). IGP can include ISIS, OSPFv2, OSPFv3, etc. The following describes the definitions from RFC 9350, using IGP. RFC 9350 specifies a set of extensions to ISIS, OSPFv2, and OSPFv3 that enable a router to advertise TLVs that (a) identify a calculation-type, (b) specify a metric-type, and (c) describe a set of constraints on the topology that are to be used to compute the best paths along the constrained topology. A given combination of calculation-type, metric-type, and constraints is known as a "Flexible Algorithm Definition" or FAD. A router that sends such a set of TLVs also assigns a Flex-Algorithm value to the specified combination of calculation-type, metric-type, and constraints. RFC 9350 also specifies a way for a router to use IGPs to associate one or more (i) Segment Routing with the MPLS Data Plane (SR-MPLS) Prefix-SIDs [RFC 8660, "Segment Routing with the MPLS Data Plane, December 2019, the contents of which are incorporated by reference in their entirety] or (ii) Segment Routing over IPv6 (SRv6) locators [RFC 8986, "Segment Routing over IPv6 (SRv6) Network Programming," February 2021, the contents of which are incorporated by reference in their entirety], with a particular Flex Algo. Each such Prefix-SID or SRv6 locator then represents a path that is computed according to the identified Flex Algo. In SRv6, it is the locator, not the SID, that holds the binding to the algorithm.

To guarantee loop-free forwarding for paths computed for a particular Flex Algo, all routers that (a) are configured to participate in a particular Flex Algo and (b) are in the same Flex Algo. Accordingly, the definition advertisement scope must agree on the definition of the Flex Algo.

Problem Statement

Again, Flex Algo has several practical use cases to optimally route traffic in a network, e.g., plane enforcements—segregating network into different planes; network subsets—create several subsets of network with selected nodes and links in each subset; and enforce topology adhering to traffic types—create subset of network adhering to low latency or having high bandwidth. As Flex Algo segregates the entire physical network into small, segregated networks, it is likely that fault tolerance for these sub networks decreases due to non-availability or sub optimal protection path for one or more hops, since TI-LFA protection runs per flex algo sub network domain. That is, nodes and/or links outside of a Flex Algo are not available within a given Flex Algo.

FIG. 1 is a network diagram of a Segment Routing network 10 with two Flex Algos defined therein, for illustrating Flex Algo operation and potential fault tolerance issues. The network 10 includes various nodes N1, N2, N3, N4, N5, PE1, PE2, PE3, PE4 where each node can be a switch, router, network element, etc. The nodes PE1, PE2, PE3, PE4 can be Provider Edge (PE) routers. Of course, the network 10 is shown as an example for illustration purposes; various other embodiments are contemplated.

In this example, there are three planes which are determined based on the SID, i.e., three sets of SIDs. A first plane covers all nodes, each node N1, N2, N3, N4, N5, PE1, PE2, PE3, PE4 has a SR nodal SID for this first plane. A second plane 12 has a subset of the nodes, e.g., the nodes PE1, N1, N3, N5, PE3. For example, the second plane 12 can utilize SIDs, referred to as Algo 128 SIDs. A third plane 14 has a subset of the nodes, e.g., the nodes PE2, N2, N4, PE4. For example, the third plane 14 can utilize SIDs, referred to as Algo 129 SIDs.

So, in operation, wherever the SID is chosen from determines which nodes are available to send the traffic. If the SID is from the first plane, any node can be used to route the traffic. Conversely, if the SID is from 128, then the traffic can only go through the nodes PE1, N1, N3, N5, PE3, and if the SID is from 129, then the traffic can only go through the nodes PE2, N2, N4, PE4.

For an example of fault tolerance issues with the Flex Algo plane 12, assume there is traffic 16 from the node PE1 to the node PE3 with a label (LBL) stack of PE3-SID$_{128}$, i.e., from the Flex Algo plane 12. Now, assume there is a fault 18, on a link between the node N3 and the node PE3. Disadvantageously, there is no protection available in the Flex Algo plane 12.

Extended Protection

To address this problem, the present disclosure provides an extended protection for a Flex Algo domain by extending its protection to one or more shared Flex Algo domain(s) as defined in FAD (Flex Algo Definition). That is, there can be one or more protection domains (planes) defined for a given Flex Algo. As described herein, the term plane and domain are used interchangeably. In the example of FIG. 1, the third plane 14 could be defined to provide extended protection for the second plane 12.

We call this extended protection and it is defined for a given Flex Algo and it can include the following rules:

(1) Extended protection can only be invoked only if a TI-LFA path is not available in the current Flex Algo domain, e.g., due to the fault 18.

(2) The node should participate in all Flex Algo for which it wants to compute its extended protection.

(3) The protection path can be used in order of the preference of the shared Flex Algo configured in the extended protection.

(4) There can be a maximum of N Flex Algos listed in an extended protection, e.g., N=5, and a lower preference number can denote higher preference for the shared Flex Algo segment to be used as extended protection. This enables multiple extended protection definitions as well as prioritizing the multiple extended protection domains.

(5) The extended protection needs to be advertised and/or configured on the nodes. This information, for the extended protection, can be shared/advertised in the network 10. FIG. 2 is a diagram of a standard FAD TLV for OSPF, with type 16, from RFC 9350, Section 5.2. FIG. 3 is a diagram of a standard FAD TLV for ISIS, with type 26, from RFC 9350, Section 5.1. These FAD TLVs are shared across the network, as defined in RFC 9350, so that all routers that (a) are configured to participate in a particular Flex Algo and (b) are in the same Flex Algo Definition advertisement scope MUST agree on the definition of the Flex Algo.

For IGP to be able to flood this information, a new sub-sub TLV 'Extended protection' can be defined in the FAD. This sub-TLV can have a list of Flex Algo numbers to be used for extended protection with a preference number. FIG. 4 is a diagram of an example sub-TLV definition for ISIS and OSPF. Of course, other approaches are contemplated, and would likely require standardization for interoperability.

This example sub-TLV definition for extended protection can include the following information:

| Byte   | Name       | Value                 |
|--------|------------|-----------------------|
| 1 byte | Type       | 7 (Extended protection) |
| 1 byte | Length     | Variable              |
| 1 byte | Preference | 1-255                 |
| 1 byte | Flex Algo  | 128-255               |

The example sub-TLV definition is included with one of the TLVs in FIGS. 2 and 3, i.e., the standard FAD TLV for OSPF or the standard FAD TLV for ISIS. That is, the example sub-TLV definition is included in a FAD for a given Flex Algo and it denotes another Flex Algo (specified by 128-255) can be used for extended protection and its preference (e.g., 1-255) where a given node will use this Flex Algo based thereon. For example, a node performing TI-LFA can use the most preferred extended protection Flex Algo, and if that is not possible, move to the next most preferred, etc.

Additional details can be added to this sub-TLV during the standardization process and as seen important by the implementations. Once this information is shared across the network, nodes which want to extend their protection for a Flex Algo segment should configure prefix SIDs for one or more Flex Algo listed in the extended protection sub-TLV.

As described above, the extended protection for Flex Algo can be utilized in several real field use cases enhancing the network resiliency along with the flexibility of Flex Algo. Some examples of these use cases are highlighted as follows.

Use Case—Flex Algo Plane Enforcement

In FIG. 1, the network 10 includes the two different planes 12, 14. Here, the extended protection can be used to define one plane as protection for another plane. FIG. 5 is a network diagram of the Segment Routing network 10 with two Flex Algos defined therein, for illustrating Flex Algo operation with extended protection. Again, as described with reference to FIG. 1, there is a fault 18, preventing protection to the node PE3 in the plane 12.

Consider two planes 12, 14 segregated to Flex Algo 128 and 129. To extend protection in Flex Algo 128, one defines extended protection with preference=1, Flex Algo=129, for the extended protection. The nodes N1, N3 need to participate in Flex Algo 129 by defining respective $SID_{129}$. For the traffic 16 between the nodes PE1, PE3, consider the fault 18 and consider the Flex Algo 128 has been defined to have extended protection via the Flex Algo 129. Again, due to the fault 18, there is no protection in the Flex Algo 128 domain. The node N3 can route the traffic to the node PE3, traffic 20, through the extended protection using Flex Algo 129. Here, the node N3 can compute the protection path, using the Flex Algo 129, and use a protection label stack, PE3-$SID_{129}$.

Use Case—Flex Algo Topology Subsets

FIG. 6 is a network diagram of a Segment Routing network 30 showing a full physical topology. Here, the network 30 includes nodes N1, N2, N3, N4, N5, PE1, PE2, PE3, PE4. FIG. 7 is a network diagram of a Flex Algo subset network 32 in the network 30. For example, the Flex Algo subset network 32 can be Algo 130 and can exclude the node N5 and links between the nodes N3, PE4 and the nodes N4, PE3. FIG. 8 is a network diagram of a Flex Algo subset network 34 in the network 30. The Flex Algo subset network 34 can be Algo 140 and can exclude the node PE4 and links between the nodes PE1, N2, and the nodes PE2, N1. For extended protection, the Flex Algo subset network 32 is defined to provide protection for the Flex Algo subset network 34.

As can be seen in this example, the Flex Algo subset networks 32, 34 provide a way to separate the topology of the network 30. The fact that some nodes and/or links are missing in the Flex Algo subset network 34 can lead to problems where protection is not possible. In an example, assume there is traffic 36 between the node PE1 and the node PE3 with a SID of PE3-$SID_{140}$. Now consider a fault 38 causing the node N1 to go down. The node PE1 in Flex Algo 140 will have no path to either the nodes N1, N2. Due to the extended protection, the node PE1 routes traffic 40 through the node N2 using extended protection provided by Algo 130. The node PE1 can use a protection label stack of N2-$SID_{130}$ and PE3-$SID_{140}$. Of note, once the traffic 40 reaches the node N2, which is also part of the Flex Algo 140, the node N2 can move the traffic back only the native Flex Algo 140 towards the node PE3.

Use Case—Flex Algo Traffic Type Adherence

Figure 9:
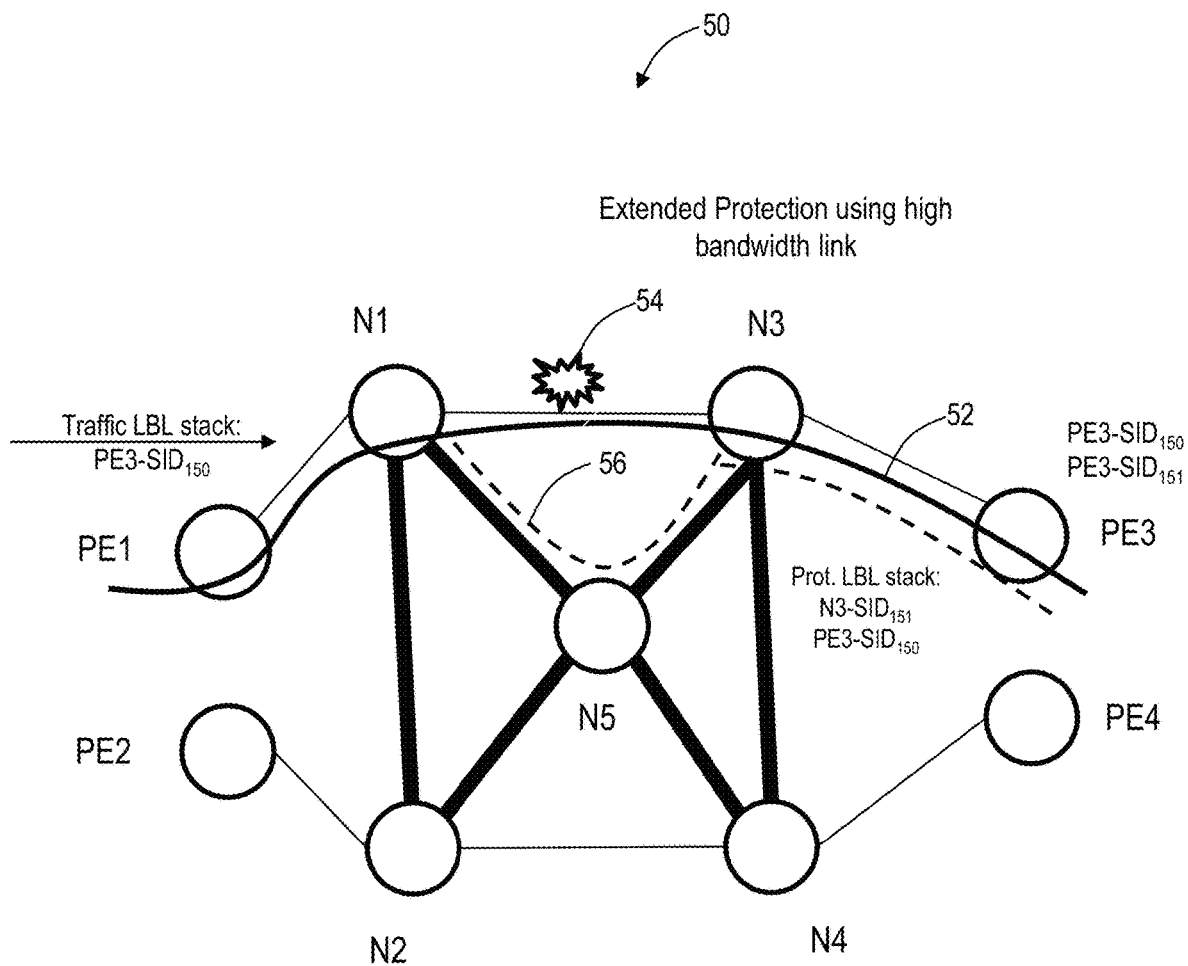
FIG. 9 is a network diagram of a Segment Routing network with two Flex Algos, denoted as Algos 150, 151, each having different traffic types.

FIG. 9 is a network diagram of a Segment Routing network 50 with two Flex Algos, denoted as Algos 150, 151, each having different traffic types. In addition to different planes and different topologies (network subsets), Flex Algo can be used for segmenting different traffic types. In the network 50, there are two Flex Algos, referred to as Algo 150, 151, which define different links. The Algo 150 is for low latency traffic and the Algo 151 is for high bandwidth traffic. All nodes N1, N2, N3, N4, N5 participate in both Algo 150 and 151. However, the high bandwidth links are highlighted in bold black lines are part of Flex Algo 151 solely, whereas the low latency links are regular sized links.

For low latency traffic 52 between the nodes PE1, PE3 on Flex Algo 150, consider a link fault 54, extended protection can be defined to utilize high bandwidth links. The node PE1 routes 56 traffic through N5 using extended protection provided by Algo 151, the node N3-PE3 uses the path provided by native Flex Algo 150.

Example Node

Figure 10:
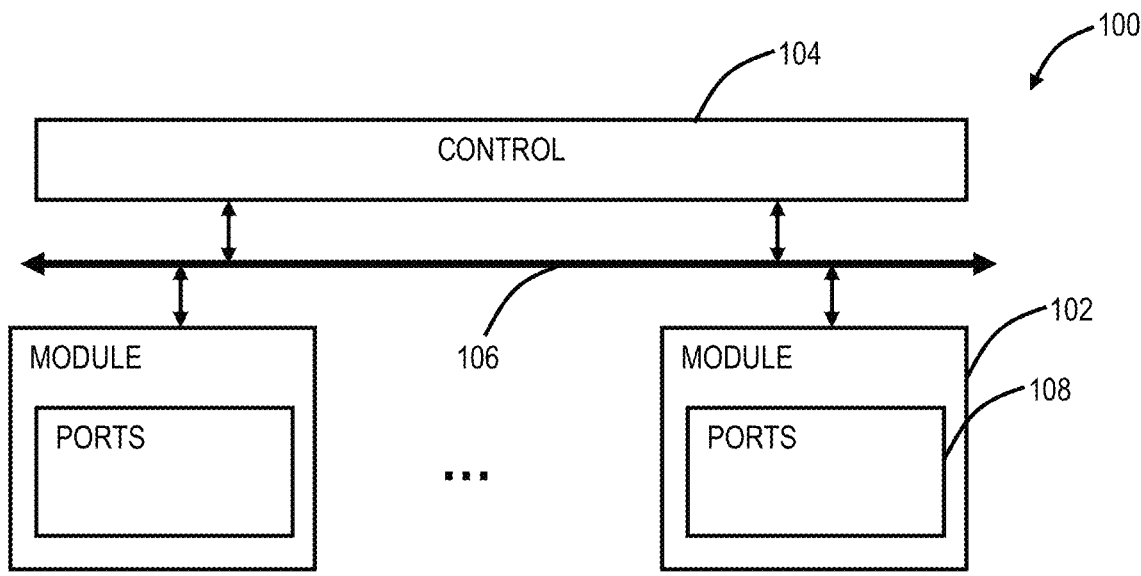
FIG. 10 is a block diagram of an example implementation of a router, such as forming any of the nodes described herein.

FIG. 10 is a block diagram of an example implementation of a router 100, such as forming any of the nodes described herein. Those of ordinary skill in the art will recognize FIG. 10 is a functional diagram in an oversimplified manner, and a practical embodiment may include additional components and suitably configured processing logic to support known or conventional operating features that are not described in detail herein.

In an embodiment, the router 100 can be any network element or other implementations that support Segment Routing and Flex Algo. In this embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching/routing units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, a PCE, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 10 is meant to provide a functional view, and those of ordinary skill in the art will recognize actual hardware implementations may vary; all of which are contemplated herewith.

Example Controller

Figure 11:
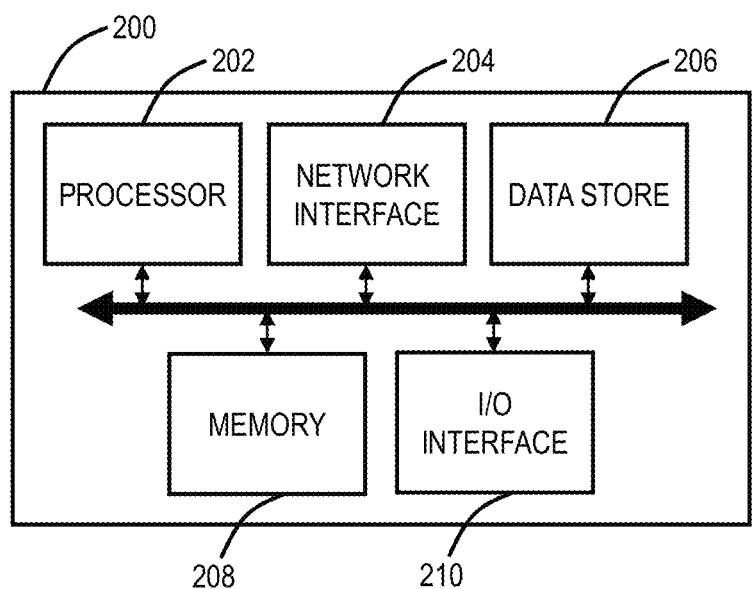
FIG. 11 is a block diagram of an example processing device.

FIG. 11 is a block diagram of an example processing device 200. The processing device 200 can be part of the router 100, or a stand-alone device communicatively coupled to the network element 100, such as a PCE. Also, the processing device 200 can be referred to in implementations as a control module, a shelf controller, a shelf processor, a system controller, etc. The processing device 200 can be configured to perform the various functions described herein, including computing protection, managing the Flex Algo definitions, and utilizing the extended protection based on the Flex Algo definitions. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Extended Protection Process—Definition

Figure 12:
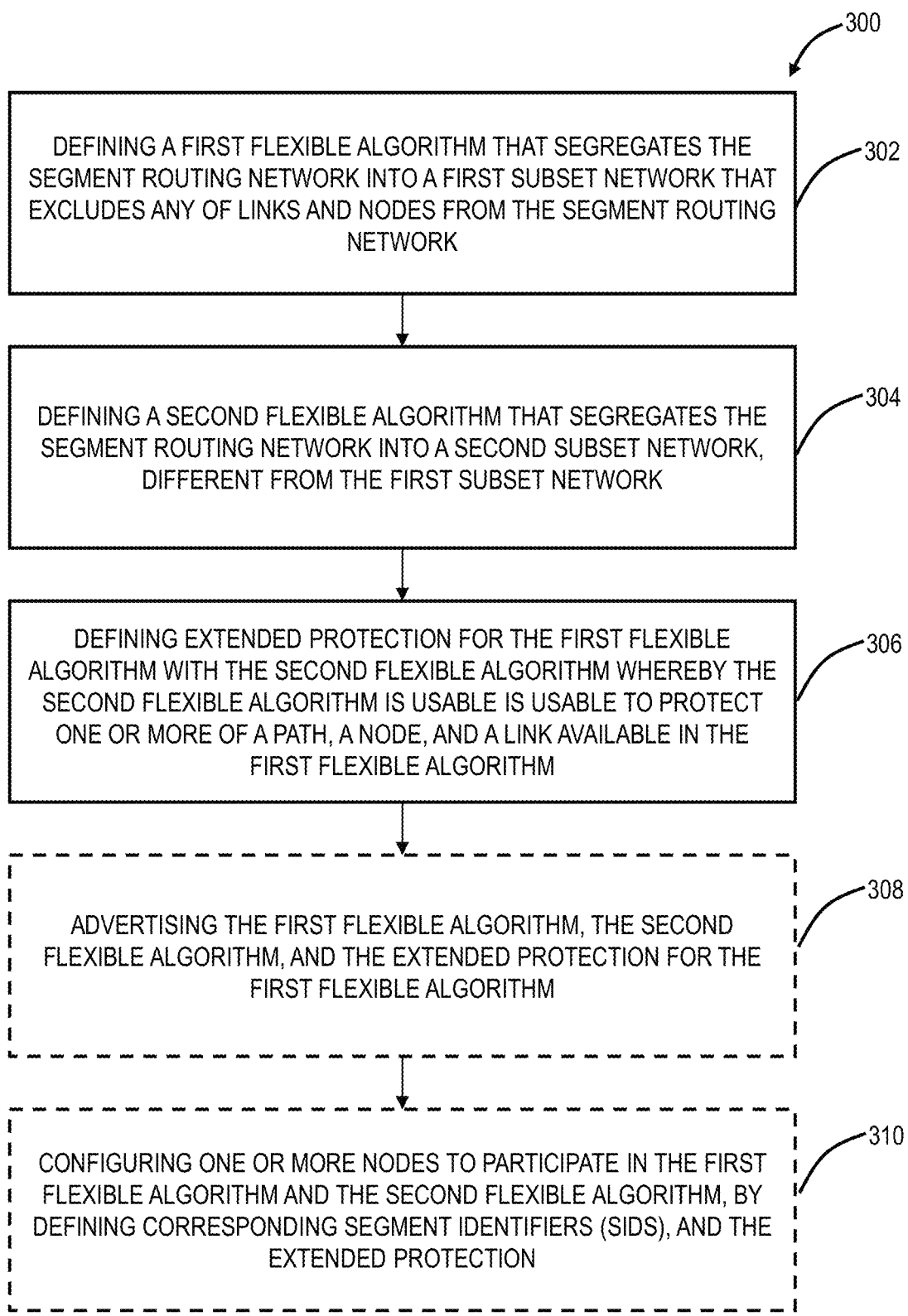
FIG. 12 is a flowchart of a process for extended protection in Segment Routing Flexible Algorithm.

FIG. 12 is a flowchart of a process 300 for extended protection in Segment Routing Flexible Algorithm. The process 300 contemplates implementation as a method having steps, via the processing device 200 configured to implement the steps, via one of the routers 100 configured to implement the steps, and via a non-transitory computer-readable medium storing instructions that, when executed, cause one or more processors to implement the steps. The process 300 is from the definition perspective whereby the Flex Algos are defined, such as using techniques in RFC 9350, and whereby the extended protection described herein is defined. For example, the FAD is as known in the art and the present disclosure can add the additional definition of extended protection. The process 300 can therefore be implemented via a PCE, via a management system, via a Command Line Interface (CLI), via an element management system connected to the nodes, and the like.

The process 300 includes defining a first Flexible Algorithm that segregates the Segment Routing network 10, 30, 50 into a first subset network that excludes any of links and nodes from the Segment Routing network 10, 30, 50 (step 302); defining a second Flexible Algorithm that segregates the Segment Routing network 10, 30, 50 into a second subset network, different from the first subset network (step 304); and defining extended protection for the first Flexible Algorithm with the second Flexible Algorithm whereby the second Flexible Algorithm is usable is usable to protect one or more of a path, a node, and a link available in the first Flexible Algorithm (step 306).

The process 300 can further include advertising the first Flexible Algorithm, the second Flexible Algorithm, and the extended protection for the first Flexible Algorithm (step 308). The extended protection for the first Flexible Algorithm can be advertised as a sub-Type, Length, Value (TLV) in an advertisement of the first Flexible Algorithm.

The process 300 can further include defining one or more additional Flexible Algorithms that segregate the Segment Routing network 10, 30, 50 into one or more additional subset networks, respectively; and defining the extended protection for the first Flexible Algorithm with the one or more additional subset networks, wherein the extended protection with the second Flexible Algorithm and the extended protection with the one or more additional subset networks each have a unique preference value used to determine which is used first.

In an embodiment, one or more of the first Flexible Algorithm and the second Flexible Algorithm segregate the Segment Routing network 10 to include different planes, each having at least one different node. In another embodiment, one or more of the first Flexible Algorithm and the second Flexible Algorithm segregate the Segment Routing network 30 to include different topologies, each having any of different nodes and links. In a further embodiment, one or more of the first Flexible Algorithm and the second Flexible Algorithm segregate the Segment Routing network 50 o include different traffic types, each having different links assigned to the different traffic types.

The process 300 can further include configuring one or more nodes N1, N2, N3, N4, N5, PE1, PE2, PE3, PE4 to participate in the first Flexible Algorithm and the second Flexible Algorithm, by defining corresponding Segment Identifiers (SIDs), and the extended protection (step 310). The configuring can include installing the associated Flexible Algorithm definition and the extended protection, installing corresponding Segment Identifiers (SIDs), and configuring advertisements thereof.

Extended Protection Process—Node Implementation

Figure 13:
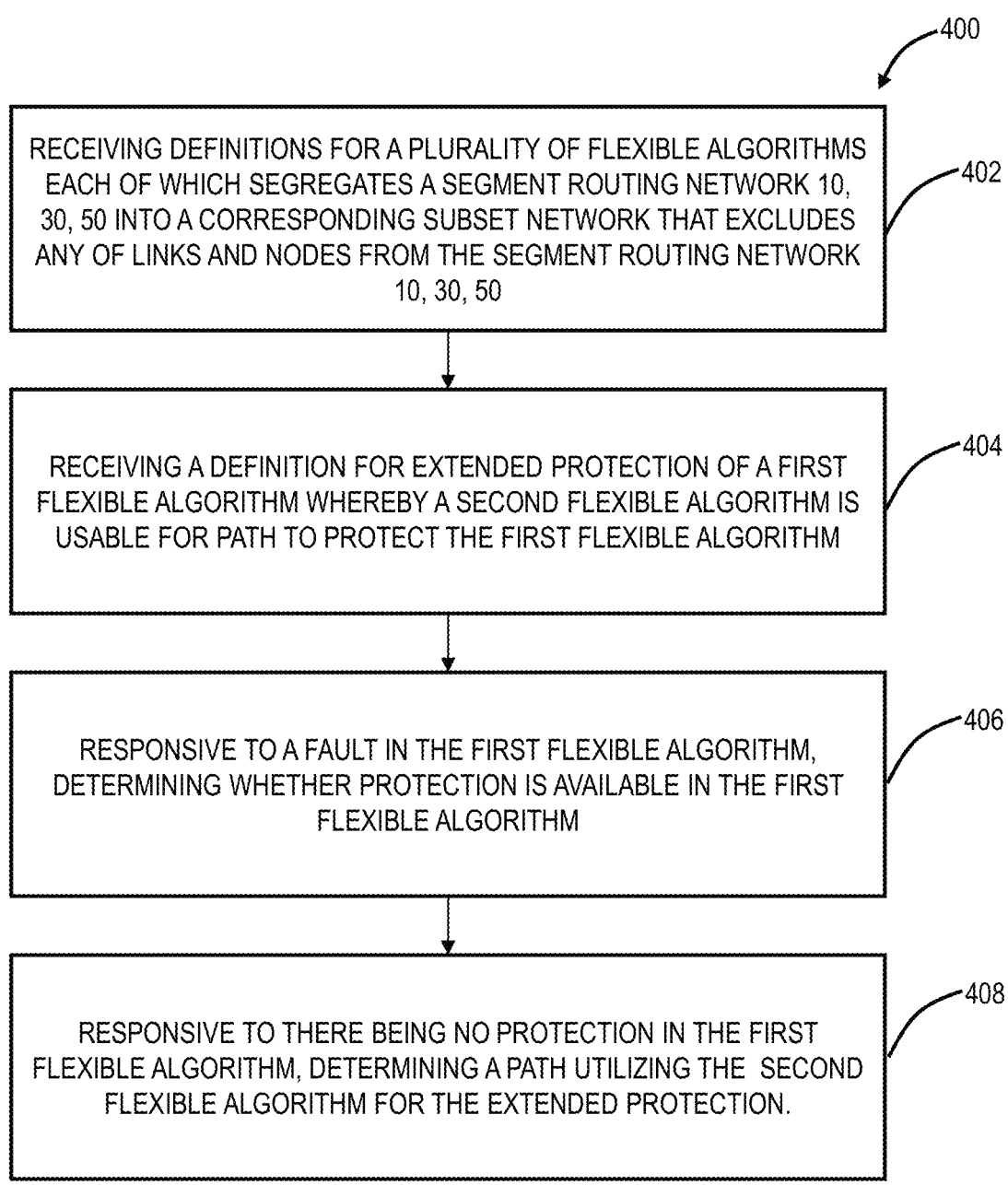
FIG. 13 is a flowchart of a process for extended protection in Segment Routing Flexible Algorithm, implemented by a node.

FIG. 13 is a flowchart of a process 400 for extended protection in Segment Routing Flexible Algorithm, implemented by a node. The process 400 contemplates implementation as a method having steps, via the processing device 200 configured to implement the steps, via one of the routers 100 configured to implement the steps, and via a non-transitory computer-readable medium storing instructions that, when executed, cause one or more processors to implement the steps. The process 400 is from the node perspective whereby the Flex Algos are already defined, such as using techniques in RFC 9350, and whereby the extended protection described herein is selected based on a fault in a given Flex Algo.

The process 400 includes receiving definitions for a plurality of Flexible Algorithms each of which segregates a Segment Routing network 10, 30, 50 into a corresponding subset network that excludes any of links and nodes from the Segment Routing network 10, 30, 50 (step 402); receiving a definition for extended protection of a first Flexible Algorithm whereby a second Flexible Algorithm is usable for path to protect the first Flexible Algorithm (step 404); responsive to a fault in the first Flexible Algorithm, determining whether protection is available in the first Flexible Algorithm (step 406); and, responsive to there being no protection in the first Flexible Algorithm, determining a path utilizing the second Flexible Algorithm for the extended protection (step 408).

The protection can be TI-LFA and the computation can be as is known in the art. Of note, the extended protection allows a separate Flexible Algorithm to be used in the computation.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A non-transitory computer-readable medium comprising instructions that, when executed, cause one or more processor to implement steps, for a Segment Routing network that utilizes Flexible Algorithm, wherein the steps include:
defining a first Flexible Algorithm that segregates the Segment Routing network into a first subset network that excludes any of links and nodes from the Segment Routing network;
defining a second Flexible Algorithm that segregates the Segment Routing network into a second subset network, different from the first subset network; and
defining extended protection for the first Flexible Algorithm with the second Flexible Algorithm whereby the second Flexible Algorithm is usable to protect one or more of a path, a node, and a link available in the first Flexible Algorithm.

2. The non-transitory computer-readable medium of claim 1, wherein the extended protection for the first Flexible Algorithm is advertised as a sub-Type, Length, Value (TLV) in an advertisement of the first Flexible Algorithm.

3. The non-transitory computer-readable medium of claim 1, wherein the steps further include
defining one or more additional Flexible Algorithms that segregate the Segment Routing network into one or more additional subset networks, respectively; and
defining the extended protection for the first Flexible Algorithm with the one or more additional subset networks, wherein the extended protection with the second Flexible Algorithm and the extended protection with the one or more additional subset networks each have a unique preference value used to determine which is used first.

4. The non-transitory computer-readable medium of claim 1, wherein one or more of the first Flexible Algorithm and the second Flexible Algorithm segregate the Segment Routing network to include different planes, each having at least one different node.

5. The non-transitory computer-readable medium of claim 1, wherein one or more of the first Flexible Algorithm and the second Flexible Algorithm segregate the Segment Routing network to include different topologies, each having any of different nodes and links.

6. The non-transitory computer-readable medium of claim 1, wherein one or more of the first Flexible Algorithm and the second Flexible Algorithm segregate the Segment Routing network to include different traffic types, each having different links assigned to the different traffic types.

7. The non-transitory computer-readable medium of claim 1, wherein the steps further include
configuring one or more nodes with the first Flexible Algorithm, the second Flexible Algorithm, and the extended protection.

8. The non-transitory computer-readable medium of claim 7, wherein the configuring includes installing the associated Flexible Algorithm definition and the extended protection, installing corresponding Segment Identifiers (SIDs), and configuring advertisements thereof.

9. A method associated with a Segment Routing network that utilizes Flexible Algorithm, the method comprising steps of:
defining a first Flexible Algorithm that segregates the Segment Routing network into a first subset network that excludes any of links and nodes from the Segment Routing network;
defining a second Flexible Algorithm that segregates the Segment Routing network into a second subset network, different from the first subset network; and
defining extended protection for the first Flexible Algorithm with the second Flexible Algorithm whereby the second Flexible Algorithm is usable is usable to protect one or more of a path, a node, and a link available in the first Flexible Algorithm.

10. The method of claim 9, wherein the extended protection for the first Flexible Algorithm is advertised as a sub-Type, Length, Value (TLV) in an advertisement of the first Flexible Algorithm.

11. The method of claim 9, wherein the steps include
defining one or more additional Flexible Algorithms that segregate the Segment Routing network into one or more additional subset networks, respectively; and
defining the extended protection for the first Flexible Algorithm with the one or more additional subset networks, wherein the extended protection with the second Flexible Algorithm and the extended protection with the one or more additional subset networks each have a unique preference value used to determine which is used first.

12. The method of claim 9, wherein one or more of the first Flexible Algorithm and the second Flexible Algorithm segregate the Segment Routing network to include different planes, each having at least one different node.

13. The method of claim 9, wherein one or more of the first Flexible Algorithm and the second Flexible Algorithm segregate the Segment Routing network to include different topologies, each having any of different nodes and links.

14. The method of claim 9, wherein one or more of the first Flexible Algorithm and the second Flexible Algorithm segregate the Segment Routing network to include different traffic types, each having different links assigned to the different traffic types.

15. The method of claim 9, wherein the steps include
configuring one or more nodes with the first Flexible Algorithm, the second Flexible Algorithm, and the extended protection.

16. The method of claim 15, wherein the configuring includes installing the associated Flexible Algorithm definition and the extended protection, installing corresponding Segment Identifiers (SIDs), and configuring advertisements thereof.

17. An apparatus comprising:
one or more processors; and
memory storing instructions that, when executed, causes the one or processors to
define a first Flexible Algorithm that segregates the Segment Routing network into a first subset network that excludes any of links and nodes from the Segment Routing network,
define a second Flexible Algorithm that segregates the Segment Routing network into a second subset network, different from the first subset network, and define extended protection for the first Flexible Algorithm with the second Flexible Algorithm whereby the second Flexible Algorithm is usable is usable to protect one or more of a path, a node, and a link available in the first Flexible Algorithm.

18. The apparatus of claim 17, wherein the memory storing instructions that, when executed, further causes the one or processors to configure one or more nodes with the first Flexible Algorithm, the second Flexible Algorithm, and the extended protection.

19. The apparatus of claim 18, wherein the memory storing instructions that, when executed, further causes the one or processors to install the associated Flexible Algorithm definition and the extended protection, install corresponding Segment Identifiers (SIDs), and configure advertisements thereof.

20. The apparatus of claim 17, wherein one or more of the first Flexible Algorithm and the second Flexible Algorithm segregate the Segment Routing network to include one or more of different planes, each plane having at least one different node, different topologies, each topology having any of different nodes and links, and different traffic types, each traffic type having different links assigned to the different traffic types.

* * * * *